(12) United States Patent
Ali et al.

(10) Patent No.: US 10,846,586 B2
(45) Date of Patent: Nov. 24, 2020

(54) ELECTRONIC WIRELESS COMMUNICATION DEVICE HAVING TWO ELECTRONIC CHIPS AND A METHOD OF FABRICATING SUCH A DEVICE

(71) Applicant: IDEMIA FRANCE, Colombes (FR)

(72) Inventors: Ahmed Ali, Colombes (FR); Olivier Bosquet, Colombes (FR)

(73) Assignee: IDEMIA FRANCE, Colombes (FR)

( * ) Notice: Subject to any disclaimer, the term of this patent is extended or adjusted under 35 U.S.C. 154(b) by 107 days.

(21) Appl. No.: 16/065,276

(22) PCT Filed: Dec. 23, 2016

(86) PCT No.: PCT/FR2016/053658
§ 371 (c)(1),
(2) Date: Jun. 22, 2018

(87) PCT Pub. No.: WO2017/109434
PCT Pub. Date: Jun. 29, 2017

(65) Prior Publication Data
US 2020/0160143 A1    May 21, 2020

(30) Foreign Application Priority Data
Dec. 23, 2015 (FR) .................. 15 63265

(51) Int. Cl.
*G06K 7/08* (2006.01)
*G06K 19/06* (2006.01)
(Continued)

(52) U.S. Cl.
CPC ... *G06K 19/07794* (2013.01); *G06K 19/0723* (2013.01); *G06K 19/07767* (2013.01); *H01Q 1/2225* (2013.01); *H01Q 1/38* (2013.01)

(58) Field of Classification Search
USPC .................................. 235/451, 492
See application file for complete search history.

(56) References Cited

U.S. PATENT DOCUMENTS 6,512,482 B1 * 1/2003 Nelson ............... H01Q 1/248
343/700 MS
7,439,933 B2 * 10/2008 Uesaka ............... H01Q 1/22
235/492

(Continued)

FOREIGN PATENT DOCUMENTS

| EP | 1 031 939 A1 | 8/2000 |
| EP | 2 098 981 A1 | 9/2009 |
| JP | 2003 331238 A | 11/2003 |

OTHER PUBLICATIONS

International Search Report and Written Opinion dated Mar. 9, 2017, International Application No. PCT/FR2016/053658, 9 pages, (English translation of ISR only).

*Primary Examiner* — Tuyen K Vo
(74) *Attorney, Agent, or Firm* — MH2 Technology Law Group, LLP (57) ABSTRACT

An electronic wireless communication device (200) that includes first and second electronic chips (202, 204); a first antenna (206) electrically connected to the first electronic chip (202); a second antenna (208) electrically connected to the second electronic chip (204); and a third antenna (210) that is adapted to be electromagnetically coupled with the first and second antennas (206, 208). The first electronic chip (202) is configured to communicate with a first external terminal using a first protocol via a first antenna pair formed by the first antenna (206) and the third antenna (210); and the second electronic chip (204) is configured to communicate with the first external terminal and/or a second external terminal using a second protocol via a second antenna pair formed by the second antenna (208) and the third antenna (210).

15 Claims, 7 Drawing Sheets

(51) Int. Cl.
  *G06K 19/077* (2006.01)
  *G06K 19/07* (2006.01)
  *H01Q 1/22* (2006.01)
  *H01Q 1/38* (2006.01)

(56) References Cited

U.S. PATENT DOCUMENTS

| | | | |
|---|---|---|---|
| 7,501,954 B1* | 3/2009 | Chung | G06K 7/10336 |
| | | | 340/572.7 |
| 8,210,427 B2* | 7/2012 | Noda | G06K 7/0008 |
| | | | 235/382 |
| 2006/0118625 A1* | 6/2006 | Sekita | G06F 1/162 |
| | | | 235/451 |
| 2007/0024423 A1* | 2/2007 | Nikitin | G06K 19/0723 |
| | | | 340/10.1 |
| 2008/0035741 A1* | 2/2008 | Sakama | G06K 19/07749 |
| | | | 235/492 |
| 2008/0058029 A1* | 3/2008 | Sato | G06K 19/0702 |
| | | | 455/573 |
| 2008/0308641 A1* | 12/2008 | Finn | G06K 19/0723 |
| | | | 235/492 |
| 2009/0224058 A1 | 9/2009 | Savry | |
| 2009/0308933 A1* | 12/2009 | Osada | H02J 50/10 |
| | | | 235/492 |

* cited by examiner

ELECTRONIC WIRELESS COMMUNICATION DEVICE HAVING TWO ELECTRONIC CHIPS AND A METHOD OF FABRICATING SUCH A DEVICE

CROSS-REFERENCE TO RELATED APPLICATIONS

This application is a U.S. National Stage application of International Application No. PCT/FR2016/053658 filed 23 Dec. 2016, which claims priority to French Application No. 1563265 filed 23 Dec. 2015, the entire disclosures of which are hereby incorporated by reference in their entireties.

BACKGROUND OF THE INVENTION

The present invention relates to the field of electronic wireless communication devices, having at least two electronic chips, each chip being associated with a respective antenna in order to communicate with an external terminal.

The invention applies particularly, but not exclusively, to smart cards, such as bank cards of the ID-1 format as specified in the standard ISO 7810, presenting dimensions of 85.6 millimeters (mm) by 53.98 mm by 0.76 mm, and having two electronic chips.

In known manner, electronic wireless communication devices such as a smart card may have two electronic chips, each chip having a different function.

Figure 1:
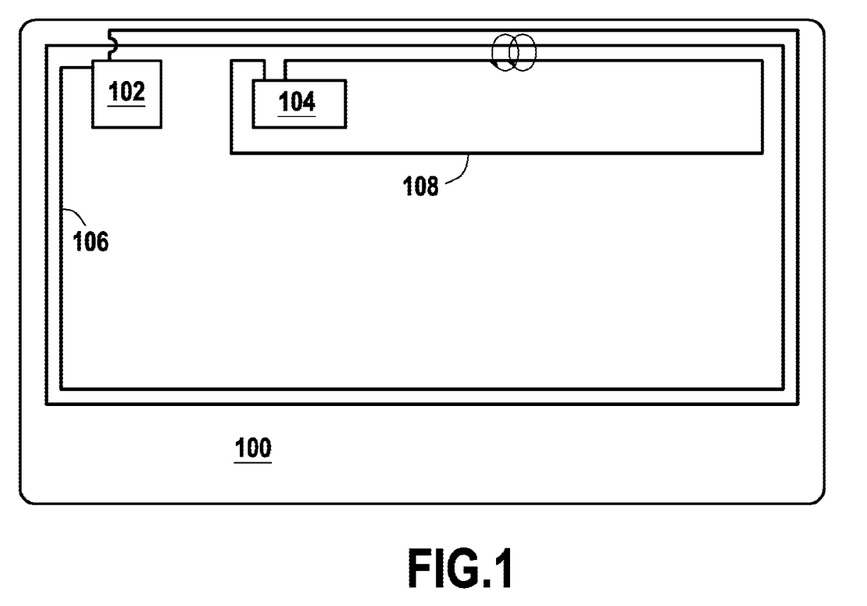
FIG. 1, described above, is a diagrammatic plan view of a conventional electronic wireless communication device.

FIG. 1 shows such an electronic wireless communication device 100 in the form of a smart card. The device 100 has a first electronic chip 102 and a second electronic chip 104.

The first electronic chip 102 is electrically connected to a first antenna 106 and is configured to communicate with an external terminal by means of the first antenna 106 using a first communication protocol. The first electronic chip 102 performs a contactless payment function.

The second electronic chip 104 is electrically connected to a second antenna 108 and is configured to communicate with an external terminal by means of the second antenna 108 using a second communication protocol. The second electronic chip 104 performs a function of controlling a display for a dynamic verification code (also known as a "motion code") of the device 100.

The operating communication frequency band of the set-up comprising the first electronic chip 102 and the first antenna 106 is broader than the operating communication frequency band of the set-up comprising the second electronic chip 104 and the second antenna 108, and the two operating communication frequency bands are very close, since they are contained within the communication frequency band of an external terminal.

Complete electromagnetic isolation between the two antennas is thus not possible, since the radiofrequency technologies used in smart cards are not sufficiently selective to be capable of isolating the operating communication frequency band of the set-up comprising the first chip 102 and the first antenna 106 from the operating communication frequency band of the set-up comprising the second chip 104 and the second antenna 108 within the communication frequency band of the external terminal, which, by way of example, may be a band going from 12 megahertz (MHz) to 19 MHz, and which may vary from one external terminal to another.

In order to pick up sufficient electromagnetic flux emitted by an external terminal to enable the first electronic chip 102 to communicate with the external terminal, the first antenna 106 is of dimensions that are quite large. Likewise, in order to pick up sufficient electromagnetic flux emitted by an external terminal to enable the second electronic chip 104 to communicate with the external terminal, the second antenna 108 is of dimensions that are great large, but nevertheless smaller than the dimensions of the first antenna 106.

The small size of the device 100 and the large size of the two antennas 106 and 108 means that the antennas 106 and 108 are located in the proximity of each other in the device 100. This physical proximity of the antennas 106 and 108 leads to a phenomenon of interfering electromagnetic coupling between the two antennas 106 and 108.

The interfering electromagnetic coupling degrades the performance of the antennas 106 and 108, thus leading to problems of communication for each of the antennas 106 and 108.

More precisely, during communication between the first chip 102 and an external terminal by means of the first antenna 106, the second antenna 108 consumes energy and leads to the operating frequency band of the set-up comprising the first chip 102 and the first antenna 106 being shifted, since the effective amount of flux picked up by the first antenna 106 in the presence of the second antenna 108 is reduced, which implies reduced inductance, and a resonant frequency shifted towards higher frequencies.

Personalization of the first electronic chip 102 by means of an external terminal, and also payment by means of the first electronic chip 102 are thus difficult to perform, e.g. because the operating frequency band of the set-up comprising the first chip 102 and the first antenna 106 is no longer contained within the optimized communication frequency band of the external terminal.

Likewise, during communication between the second chip 104 and an external terminal by means of the second antenna 108, the first antenna 106 consumes energy, thereby causing the operating frequency band of the set-up comprising the second chip 104 and the second antenna 108 to be shifted. Personalization of the second electronic chip 104 by means of an external terminal is then difficult to perform.

There therefore exists a need for a solution making it possible to conserve the operating communication frequency band of the device, while minimizing interfering electromagnetic coupling between the antennas.

OBJECT AND SUMMARY OF THE INVENTION

To this end, the present invention provides an electronic wireless communication device comprising:
  a first electronic chip and a second electronic chip;
  a first antenna electrically connected to the first electronic chip; and
  a second antenna electrically connected to the second electronic chip;
  the electronic device further comprising a third antenna adapted to be electromagnetically coupled with the first antenna and with the second antenna, such that:
    the first electronic chip is configured to communicate with a first external terminal using a first protocol by means of a first antenna pair formed by the first antenna and the third antenna; and
    the second electronic chip is configured to communicate with the first external terminal and/or a second external terminal using a second protocol by means of a second antenna pair formed by the second antenna and the third antenna.

Since the communication frequency band of an set-up comprising the first electronic chip and the first antenna pair is broader than the communication frequency band of an set-up comprising the first electronic chip and the first antenna, the first chip can communicate with a greater number of external terminals.

Likewise, since the communication frequency band of an set-up comprising the second electronic chip and the second antenna pair is broader than the communication frequency band of an set-up comprising the second electronic chip and the second antenna, the second chip can communicate with a greater number of external terminals.

Since the first antenna together with the third antenna form a first antenna pair, it is possible to reduce the size of the first antenna, while conserving good communication performance. Specifically, the third antenna serves to pick up more electromagnetic flux.

Likewise, since the second antenna together with the third antenna form a second antenna pair, it is possible to reduce the size of the second antenna, while conserving good communication performance.

Since the dimensions of the first antenna and of the second antenna are reduced, it is possible for the first antenna to be further away from the second antenna, thereby limiting the effect of interfering coupling between the first and second antennas.

In a particular embodiment, the area defined by the third antenna is greater than the area defined by the first antenna and/or the area defined by the second antenna.

The large dimensions of the third antenna enable the third antenna to pick up a large amount of electromagnetic flux, which is additional to the flux picked up by the first antenna or to the flux picked up by the second antenna. It is thus possible to reduce the dimensions of the first antenna and of the second antenna, while conserving good communication performance.

Since the dimensions of the first antenna and of the second antenna are reduced, it is possible for the first antenna and the second antenna to be further apart, thereby limiting the effect of interfering coupling between the first and second antennas.

In a particular embodiment, the area defined by the first antenna is substantially identical to the area defined by the second antenna.

The performance of the first antenna is thus substantially equal to the performance of the second antenna, and it is possible to use the same external communication terminal for communicating with both electronic chips.

In a particular embodiment, the first, second, and third antennas are substantially plane, and each presents an elongate shape defining a length and a width, the first, second, and third antennas being arranged in such a manner that:
    the projection of the longitudinal direction of the first antenna onto the plane of the third antenna is parallel to the lateral direction of the third antenna; and
    the projection of the longitudinal direction of the second antenna onto the plane of the third antenna is parallel to the longitudinal direction of the third antenna.

The effect of interfering coupling between the first antenna and the second antenna is thus reduced.

In a particular embodiment, the first antenna is arranged at a first distance from the second antenna and at a second distance from the third antenna, the first distance being greater than the second distance.

In a particular embodiment, the third antenna is substantially plane, and the first, second, and third antennas are arranged in such a manner that the projection of the first antenna onto the plane of the third antenna extends outside the third antenna, and the projection of the second antenna onto the plane of the third antenna extends inside the third antenna.

The effect of interfering coupling between the first antenna and the second antenna is thus reduced.

In a particular embodiment, the operating frequency band of the third antenna taken in isolation is broader than the operating frequency band of a first set-up comprising the first electronic chip and the first antenna taken in isolation, or than the operating frequency band of a second set-up comprising the second electronic chip and the second antenna taken in isolation.

In a particular embodiment, the width of the operating frequency band of a first set-up comprising the first electronic chip and the first antenna taken in isolation is substantially identical to the operating frequency band of a second set-up comprising the second electronic chip and the second antenna taken in isolation.

Thus, the same external terminal can be used to communicate with the first electronic chip and with the second electronic chip.

In a particular embodiment,
    a third set-up comprising the first chip and the first antenna pair operates in a first frequency band that is continuous; and
    a fourth set-up comprising the second chip and the second antenna pair operates in a second frequency band that is continuous.

In a particular embodiment, the communication protocol of the first electronic chip is defined by the standard ISO 14433 and the communication protocol of the second electronic chip is defined by the standard ISO 15693.

In a particular embodiment,
    the first electronic chip is configured to communicate with the first external terminal by means of the first antenna pair at a frequency of about 13.56 MHz; and/or
    the second electronic chip is configured to communicate with the first external terminal and/or the second external terminal by means of the second antenna pair at a frequency of about 13.56 MHz.

In a particular embodiment, the first electronic chip is configured to make a payment and the second electronic chip is configured to control an electronic component of said device.

In a particular embodiment, the electronic component is a screen adapted to display a security code.

In a particular embodiment, the device includes identification numbers, the security code being for use in combination with the identification numbers in order to make a payment.

In a particular embodiment, the electronic device is a smart card of ID-1 format as defined by the standard ISO 7810.

The invention also provides a method of fabricating an electronic device as described above, said method comprising:
    forming the third antenna on a layer of a first substrate comprising at least one layer;
    forming the first antenna on a second substrate or on the first substrate;
    positioning the first chip on the first substrate or on the second substrate;
    forming the second antenna on a third substrate or on the first substrate; and
    positioning the second chip on the first substrate or on the third substrate.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF EMBODIMENTS

The present invention relates to the field of electronic wireless communication devices having at least two electronic chips, each being associated with a respective antenna in order to communicate with an external terminal.

Figure 2:
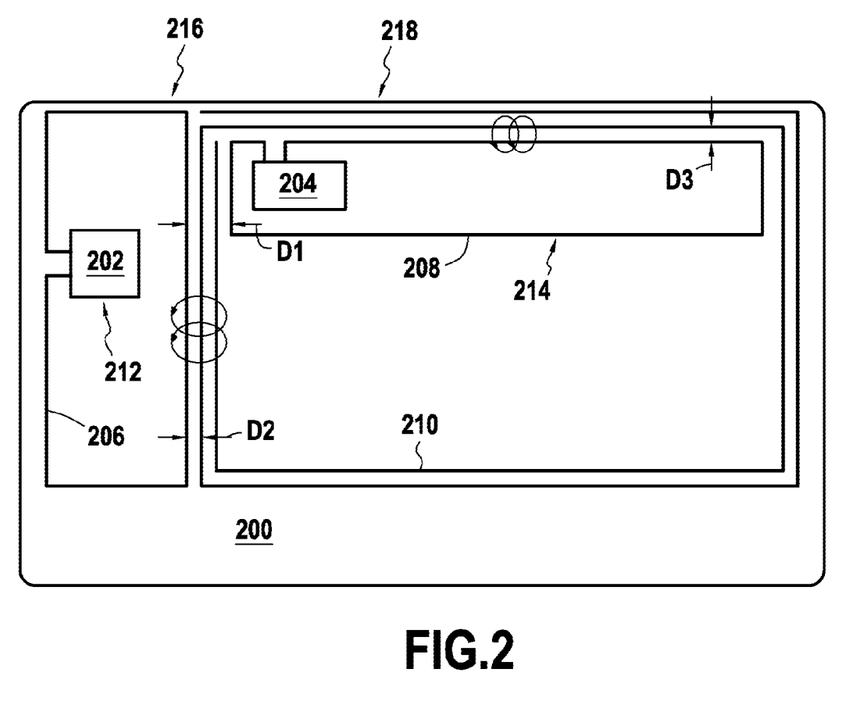
FIG. 2 is a diagrammatic plan view of an electronic wireless communication device in accordance with an embodiment of the invention.

FIG. 2 is a transparent view from above of an electronic wireless communication device 200 in accordance with an embodiment of the invention. The device 200 has a first electronic chip 202 and a second electronic chip 204.

The device 200 also has a first antenna 206 electrically connected to the first electronic chip 202, and a second antenna 208 electrically connected to the second electronic chip 204.

Furthermore, the device 200 has a third antenna 210 adapted to be electromagnetically coupled with the first antenna 206 in such a manner that the first electronic chip 202 is configured to communicate with a first external terminal while using a first protocol and by means of a first antenna pair made up of the first antenna 206 and the third antenna 210.

Furthermore, the third antenna 210 is adapted to be electromagnetically coupled with the second antenna 208 in such a manner that the second electronic chip 204 is configured to communicate with the first external terminal and/or a second external terminal while using a second protocol and by means of a second antenna pair formed by the second antenna 208 and the third antenna 210.

The term "a first antenna pair formed by the first antenna 206 and the third antenna 210" is used to mean that the first antenna pair is formed by the first antenna 206 coupling with the third antenna 210. Likewise, the term "a second antenna pair formed by the second antenna 208 and the third antenna 210" is used to mean that the second antenna pair is formed by the second antenna 208 coupling with the third antenna 210.

The first electronic chip 202 and the first antenna 206 thus form a first communication set-up 212. In addition, the second electronic chip 204 and the second antenna 208 form a second communication set-up 214.

The first electronic chip 202 together with the first antenna 206 coupled with the third antenna 210, i.e. together with the first antenna pair, form a third communication set-up 216. In addition, the second electronic chip 204 together with the second antenna 208 coupled with the third antenna 210, i.e. with the second antenna pair, form a fourth communication set-up 218.

In a variant, the device 200 has more than two electronic chips. Each electronic chip is then electrically connected to a respective antenna, with each antenna being coupled with a common coupling antenna.

Figure 3:
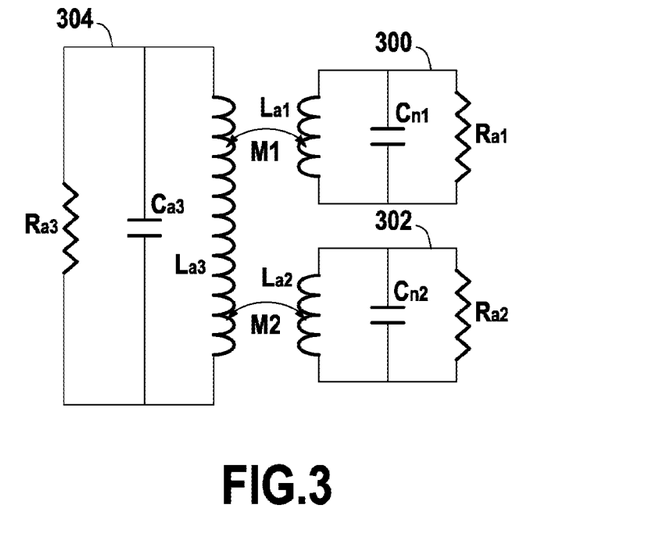
FIG. 3 is a circuit diagram corresponding to an electronic wireless communication device in accordance with an embodiment of the invention.
Figure 5:
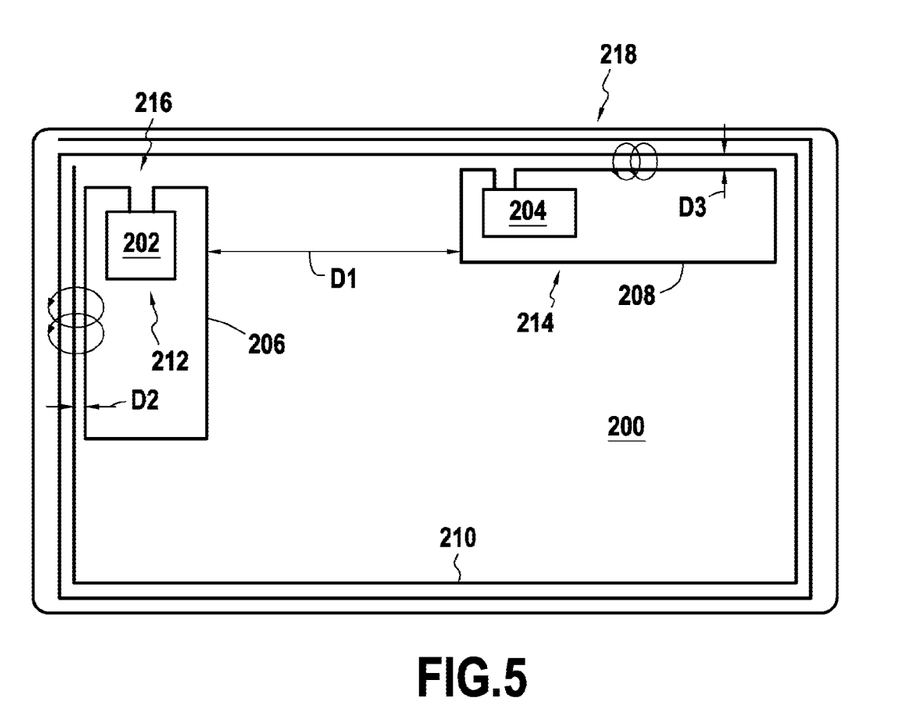
FIG. 5 is a diagrammatic plan view of an electronic wireless communication device in accordance with an embodiment of the invention.
Figure 11:
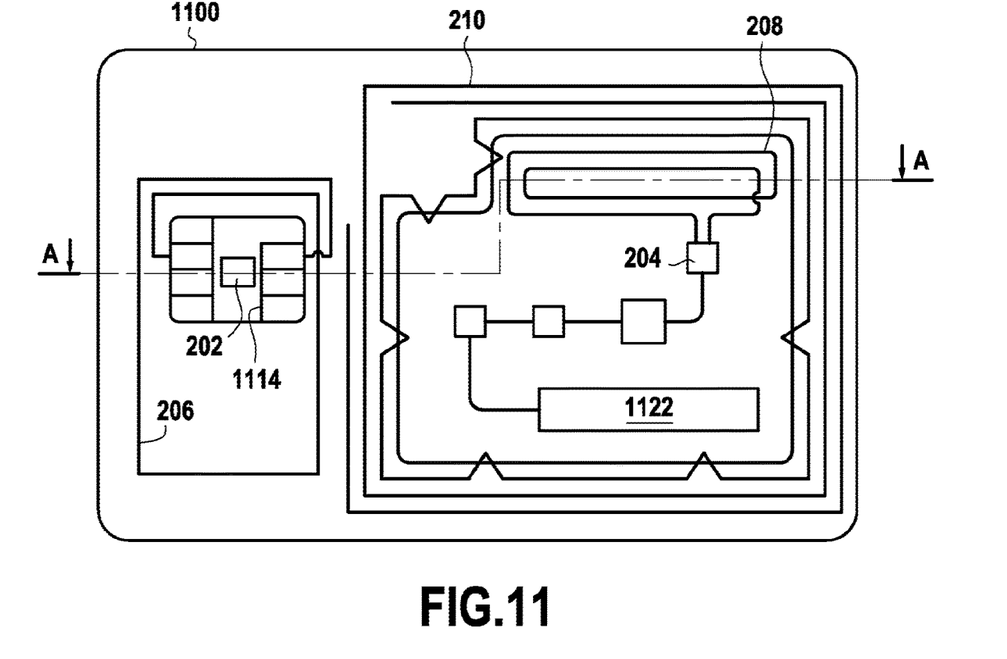
FIG. 11 is a diagrammatic plan view of an electronic wireless communication device in accordance with an embodiment of the invention.

FIG. 3 is an electrical circuit diagram corresponding to a device 200 in accordance with an embodiment of the invention, e.g. the device of FIG. 2, of FIG. 5, or of FIG. 11. More precisely, the electrical circuit diagram shows in detail the equivalent circuit for each antenna 206, 208, 210 and each electronic chip 202, 204, together with the mutual coupling between the third antenna 210 and the other two antennas 206 and 208.

The circuit diagram has a first RLC circuit 300 corresponding to the first communication set-up 212, a second RLC circuit 302 corresponding to the second communication set-up 214, and a third RLC circuit 304 corresponding to the third antenna.

The first RLC circuit 300 comprises a first coil La1 connected in parallel with a first capacitor Cn1 and a first resistor Ra1. The first coil La1 corresponds to the impedance of the first antenna 206, the first resistor Ra1 corresponds to the resistance of the first antenna 206, and the first capacitor Cn1 corresponds to the capacitance of the first antenna 206 plus the capacitance of the first electronic chip 202.

The second RLC circuit 302 comprises a second coil La2 connected in parallel with a second capacitor Cn2 and a second resistor Ra2. The second coil La2 corresponds to the impedance of the second antenna 208, the second resistor Ra2 corresponds to the resistance of the second antenna 208, and the second capacitor Cn2 corresponds to the capacitance of the second antenna 208 plus the capacitance of the second electronic chip 204.

The third RLC circuit 304 comprises a third set-up comprising a third coil La3 connected in parallel with a third capacitor Ca3 and a third resistor Ra3. The third coil La3 corresponds to the impedance of the third antenna 210, the third resistor Ra3 corresponds to the resistance of the third antenna 210, and the third capacitor Ca3 corresponds to the capacitance of the third antenna 210.

The coupling M1 between the first coil La1 of the first RLC circuit 300 and the third coil La3 of the third RLC circuit 304 represents the coupling between the first antenna 206 and the third antenna 210. In addition, the coupling M2 between the second coil La2 of the second RLC circuit 302 and the third coil La3 of the third RLC circuit 304 represents the coupling between the second antenna 208 and the third antenna 210.

Thus, as shown in FIG. 3, the third antenna 210 is electromagnetically coupled with the first antenna 206, is electromagnetically coupled with the second antenna 208, is not electrically connected to the first chip 202, and is not electrically connected to the second chip 204.

Figure 4:
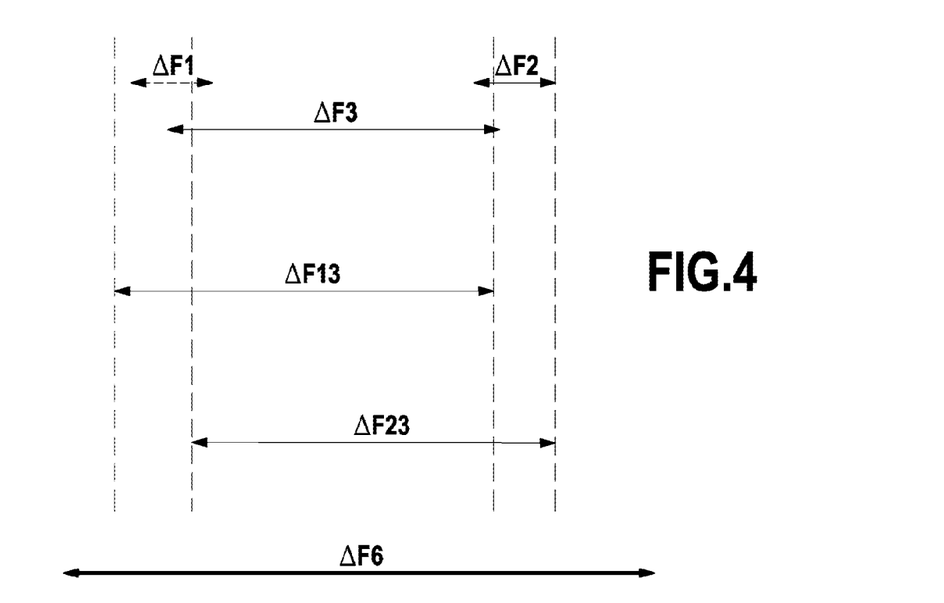
FIG. 4 is a diagram showing the operating frequency bands of an electronic wireless communication device in accordance with an embodiment of the invention.

FIG. 4 is a diagram showing the operating frequency bands of a device 200 in accordance with an embodiment of the invention, e.g. the device of FIG. 2, of FIG. 5, or of FIG. 11.

The first set-up 212 taken in isolation operates in a first frequency band AF1, the second set-up 214 taken in isolation operates in a second frequency band AF2, and the third antenna 210 taken in isolation operates in a frequency band AF3.

The term "taken in isolation" is used to mean that the antenna or the antenna of the set-up is not coupled with another antenna of the device 200;

When the first electronic chip 202 is activated, the third set-up 216 operates in a fourth operating communication or operating frequency band AF13. The fourth frequency band AF13 contains the first frequency band AF1 and is broader than the first frequency band AF1.

Likewise, when the second electronic chip 204 is activated, the fourth set-up 218 operates in a fifth operating communication or operational frequency band AF23. The fifth frequency band AF23 contains the second frequency band AF2 and is broader than the second frequency band AF2.

The fourth frequency band AF13 and the fifth frequency band AF23 have a range of frequencies in common, corresponding approximately to the third frequency band AF3. Thus, a terminal communicating at a frequency lying in the common frequency range can communicate with the first electronic chip 202 if the terminal is communicating using the first protocol, or with the second electronic chip 204 if the terminal is communicating using the second protocol.

FIG. 4 also shows a sixth operating frequency band AF6 of an external terminal, e.g. the first external terminal or the second external terminal.

In an example, the first electronic chip 202 communicates with a terminal, e.g. the first terminal, by means of the first antenna pair, at a frequency of about 13.56 MHz, e.g. at 13.56 MHz. In addition, in an example, the second electronic chip 204 communicates with said terminal and/or another terminal, e.g. the second terminal, by means of the second antenna pair, at a frequency of about 13.56 MHz, e.g. at 13.56 MHz.

Since the fourth frequency band AF13 is broader than the first frequency band AF1, the first chip 202 can communicate with a greater number of external terminals. Specifically, external terminals do not all operate using the same frequency band.

Likewise, since the fifth frequency band AF23 is broader than the second frequency band AF2, the second chip 204 can communicate with a greater number of external terminals.

The fourth frequency band AF13 or the fifth frequency band AF23 represents a subset of the overall resonant characteristic of the device 200.

Since the first antenna 206 forms a first antenna pair with the third antenna 210, it is possible to reduce the size of the first antenna 206, while conserving good communication performance. Specifically, the third antenna 210 makes it possible to pick up more electromagnetic flux.

Likewise, since the second antenna 208 forms a second antenna pair with the third antenna 210, it is possible to reduce the size of the second antenna pair 208, while conserving good communication performance.

Since the dimensions of the first antenna 206 and of the second antenna 208 are reduced, it is possible for the first antenna 206 to be spaced apart from the second antenna 208 and to be arranged in such a manner as to limit the interfering coupling effect between the first and second antennas 206 and 208.

When the device 200 is not placed in an electromagnetic field, the first electronic chip 202 is on standby and the second electronic chip 204 is on standby.

When the device 200 is placed in the electromagnetic field of an external terminal communicating using the first protocol, e.g. the first external terminal, the first electronic chip 202 is activated after recognizing the first protocol, while the second chip 204 remains on standby. The device 200 then presents the fourth frequency band AF13 in which effective communication with the external terminal is possible.

The first chip 202 and the external terminal can thus communicate in the fourth frequency band AF13 using the first protocol, with the second antenna 208 associated with the second protocol then being without effect, since it is in silent resonance.

The amount of energy transferred, i.e. the amount of electromagnetic flux that is picked up, is then greater for the first antenna pair associated with the first electronic chip 202, i.e. the third set-up 216. Specifically, activating the first electronic chip 202 increases the capacitance of the first electronic chip 202, thereby reducing the resonant frequency of the third set-up 216 so as to set said resonant frequency on the resonant frequency of the external terminal.

When the device 200 is placed in the electromagnetic field of an external terminal communicating using the second protocol, e.g. the first external terminal or the second external terminal, the second electronic chip 204 is activated after recognizing the second protocol, while the first chip 202 remains on standby. The device 200 then presents the fifth frequency band AF23, in which effective communication with the external terminal is possible.

The second chip 204 and the external terminal can thus communicate in the fifth frequency band ⊗F23 using the second protocol, the first antenna 206, which is associated with the first protocol, then being without effect, since it is in silent resonance.

The amount of energy transferred, i.e. the amount of electromagnetic flux picked up, is then greater for the second antenna pair associated with the second electronic chip 204, i.e. the fourth set-up 218. Specifically, activating the second electronic chip 204 increases the capacitance of the second electronic chip 204, thereby reducing the resonant frequency of the fourth set-up 218, so as to set said resonant frequency on the resonant frequency of the external terminal.

By way of example, the device 200 may be a smart card. In a variant, the device 200 may be some other electronic document, such as an electronic passport, an electronic identity card, or the equivalent, a radiofrequency identity (RFID) module or "tag", or a connected object.

In an example, the communication protocol of the first chip is as defined by the standard ISO 14443. In addition, in an example, the communication protocol of the second chip is as defined by the standard ISO 15693.

In an example, the first electronic chip 202 is configured to make a payment. The first electronic chip 202 thus performs a contactless payment function. A second electronic chip is then necessary for managing some other function or application, since banking organizations require that a chip dedicated to payment does not manage any other application, for security reasons.

In an example, the second chip 204 is configured to control an electronic component of said device 200. The second electronic chip 204 may for example have a function of monitoring a display for a dynamic verification code (or "motion" code) of the device 200, i.e. a screen suitable for displaying a security code.

Each antenna 206, 208, 210 is in the form of a winding having at least one turn, the winding being substantially plane. The antenna 206, 208, and 210 are thus substantially plane.

The first antenna 206 extends in a first plane, the second antenna 208 extends in a second plane, and the third antenna 210 extends in a third plane. The first, second, and third planes are substantially parallel to one another and at least two of the first, second, and third planes may coincide.

The third antenna 210 may present dimensions that are greater than those of the first antenna 206 and are greater than those of the second antenna 208. The area defined by the third antenna 210 may be greater than the area defined by the first antenna 206. Likewise, the area defined by the third antenna 210 may be greater than the area defined by the second antenna 208.

More precisely, the area in the third plane that is defined by the third antenna 210 may be greater than the area in the first plane that is defined by the first antenna 206. In addition, the area in the third plane that is defined by the third antenna 210 may be greater than the area in the second plane that is defined by the second antenna 208.

By way of example, the area defined by the third antenna 210 may be twice the area defined by the first antenna 206, and may for example be twice the area defined by the second antenna 208.

The large dimensions of the third antenna 210 enable the third antenna 210 to pick up a large amount of electromagnetic flux, which is additional to the flux picked up by the first antenna 206 or the flux picked up by the second antenna 208.

In order to cause the first chip 202 to operate, the first antenna 206 thus does not need to pick up as much magnetic flux as needs to be picked up by the first antenna 106 in FIG. 1 in order to cause the first chip 102 of FIG. 1 to operate. It is possible to reduce the dimensions of the first antenna 206, while conserving good communication performance.

Likewise, in order to cause the second chip 204 to operate, the second antenna 208 thus does not need to pick up as much magnetic flux as needs to be picked up by the second antenna 108 of FIG. 1 in order to cause the second chip 104 of FIG. 1 to operate. It is possible to reduce the dimensions of the second antenna 208, while conserving good communication performance.

Since the dimensions of the first antenna 206 and of the second antenna 208 are reduced, it is possible to move the first antenna 206 away from the second antenna 208, thereby limiting the effect of interfering coupling between the first and second antennas 206 and 208.

In an example, the area defined by the first antenna 206 is substantially equal to the area defined by the second antenna 208. More precisely, the area in the first plane that is defined by the first antenna 206 is substantially identical to the area in the second plane that is defined by the second antenna 208. Thus, the performance of the first antenna 206 is substantially equal to the performance of the second antenna 208, and it is possible to use the same external communication terminal for communicating with both of the electronic chips 202 and 204. It then suffices to control the external terminal so as to use the first communication protocol for communicating with the first electronic chip 202 and the second communication protocol for communicating with the second electronic chip 204.

The substantially plane first antenna 206 may be elongate in shape, defining a length and a width of the first antenna 206. Likewise, the substantially plane second antenna 208 may be elongate in shape, defining a length and a width of the second antenna 208. Likewise, the substantially plane third antenna 210 may be elongate in shape defining a length and a width of the third antenna 210. The first, second, and third antennas 206, 208, and 210 may then be arranged in such a manner that the projection of the longitudinal direction of the first antenna 206 onto the plane of the third antenna 210 is parallel to the lateral direction of the third antenna 210, and such that the projection of the longitudinal direction of the second antenna 208 onto the plane of the third antenna 210 is parallel to the longitudinal direction of the third antenna 210.

This serves to reduce the effect of interfering coupling between the first antenna 206 and the second antenna 208.

By way of example, the antennas 206, 208, and 210 may be substantially rectangular in shape. In this example, the first, second, and third antennas 206, 208, and 210 are arranged in such a manner that the projection of the length of the first antenna 206 onto the plane of the third antenna 210 is parallel to the width of the third antenna 210, and such that the projection of the length of the second antenna 208 onto the plane of the third antenna 210 is parallel to the length of the third antenna 210.

In a variant, the first, second, and third antennas 206, 208, and 210 may be arranged in such a manner that the projection of the longitudinal direction of the first antenna 206 onto the plane of the third antenna 210 is parallel to the longitudinal direction of the third antenna 210, and such that the projection of the longitudinal direction of the second antenna 208 onto the plane of the third antenna 210 is parallel to the lateral direction of the third antenna 210.

The first antenna 206 is arranged at a first distance from the second antenna 208 and at a second distance from the third antenna 210, where the first distance may be greater than the second distance. The first antenna 206 is thus closer to the third antenna 210 than it is to the second antenna 208.

Likewise, the second antenna 208 is arranged at a third distance from the third antenna 210, the first distance possibly being greater than the third distance. The second antenna 208 is thus closer to the third antenna 210 than it is to the first antenna 206.

In an example, the projection of the first antenna 206 onto the third plane of the third antenna 210 lies at a first minimum distance D1 from the projection of the second antenna 208 onto the third plane, and at a second minimum distance D2 from the third antenna 210, the first minimum distance D1 being greater than the second minimum distance D2.

Likewise, the projection of the second antenna 208 onto the third plane is arranged at a third minimum distance D3 from the third antenna 210, the first minimum distance D1 being greater than the third minimum distance D3.

As shown in FIG. 2, the first, second, and third antennas 206, 208, and 210 may be arranged in such a manner that the projection of the first antenna 206 onto the third plane of third antenna 210 extends outside the third antenna 210 while the projection of the second antenna 208 extends inside the third antenna 210.

The third antenna 210 thus separates the first antenna 206 from the second antenna 208, thereby serving to reduce the effect of interfering coupling between the first and second antennas 206 and 208.

In the example where the antennas 206, 208, and 210 are substantially rectangular in shape, in order to maximize the coupling between the first antenna 206 and the third antenna 210, the length of the first antenna 206 is substantially equal to the width of the third antenna 210. In addition, the length of the second antenna 208 is a little shorter than the length of the smallest turn of the third antenna 210.

In a variant, and as shown in FIG. 5, the first, second, and third antennas 206, 208, and 210 may be arranged in such a manner that the projection of the first antenna 206 onto the third plane of the third antenna 210 lies inside the third antenna 210, and the projection of the second antenna 208 lies inside the third antenna 210.

When the device 200 is a smart card, the device comprises a card body, comprising a first layer, the first and second electronic chips 202 and 204 together with the first, second, and third antennas 206, 208, and 210 possibly being arranged on the same face or on different faces of the first layer. The body of the card may include at least one additional layer positioned on a face of the first layer. The device 200 may include at least one additional layer positioned on the other face of the first layer. Each additional layer may be a layer adapted to receive a printed pattern or a transparent layer suitable for protecting the printed layer.

In a first variant, the first electronic chip 202 and the first antenna 206 are positioned on a first printed circuit, or the first electronic chip 202 is positioned on the first printed circuit. The first printed circuit may include contact areas suitable for connecting the first chip 202 to an external terminal so that the first chip 202 can also communicate with an external terminal via the contact areas. The card body then has a first cavity in which the first printed circuit is positioned.

In a second variant, which can be combined with the first variant, the second chip 204 and the second antenna 208 are positioned on a second printed circuit. The card body then has a second cavity in which the second printed circuit is positioned.

In an example, the smart card includes a screen adapted to display a security code, the screen possibly being positioned on the second printed circuit. The smart card may also have identification numbers, e.g. positioned in the surface of the card body, the security code being for use in combination with the identification numbers in order to perform a payment, e.g. a payment on the Internet.

In an example, the smart card is of the ID-1 format as defined by the standard ISO 7810. The card body then has dimensions of 85.6 mm by 53.98 mm by 0.76 mm.

Figure 12:
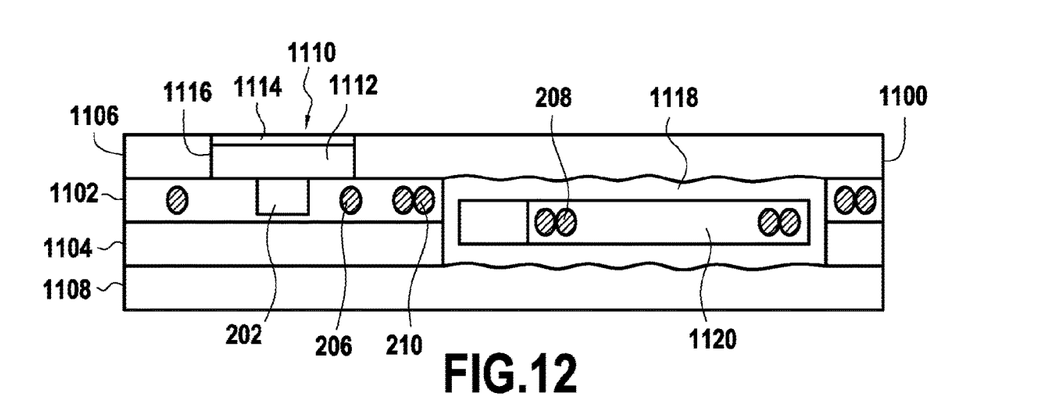
FIG. 12 is a section view on line A-A of the FIG. 11 electronic wireless communication device.

FIG. 11 is a transparent plan view of an electronic wireless communication device 200 in accordance with an embodiment of the invention, taking the form of a smart card. FIG. 12 is a section view on line A-A of the FIG. 11 electronic wireless communication device. The device 200 differs from the device of FIG. 5 in that it comprises a card body 1100, a module 1110 including a first printed circuit 1112, and a second printed circuit 1120.

The card body 1100 has a first layer 1102 in which the third antenna 210 is placed and in which it is possible to place the first antenna 206. In a variant, the first antenna 206 is placed on the first printed circuit 1112.

The card body 1100 may also include a second layer 1104 positioned on a face of the first layer 1102. In addition, the card body 1100 may include a third layer 1106 and a fourth layer 1108, the first layer 1102 and the optional second layer 1104 being positioned between the third layer 1106 and the fourth layer 1108. In an example, the first and second layers 1102 and 1104 are layers adapted to receive printed patterns and the third and fourth layers 1106 and 1108 are layers adapted to protect the first and second layers 1102 and 1104.

The card body 1100 includes a first cavity 1116 passing through at least a portion of the first layer 1102, and in an example, the third layer 1106. When the first antenna 206 is arranged on the first layer 1102, the first cavity 1116 may be positioned so as to be surrounded, in plan view, by the first antenna 206 (cf. FIG. 11).

The first chip 202 and the contact areas 1114 for connecting the first chip 202 to an external terminal in order to enable the first chip 202 to communicate with an external terminal via the contact areas, are arranged on the first printed circuit 1112. The module 1100 is arranged in the first cavity 1116. The first chip 202 is electrically connected to the first antenna 206 by connection means known to the person skilled in the art of smart cards, e.g. an anisotropic adhesive, a conductive alloy bump, or indeed conductor wires.

The card body 1100 has a second cavity 1118 passing through the first layer 1102 and possibly the second layer 1104. The second cavity is positioned so as to be surrounded, in plan view, by the third antenna 210 (cf. FIG. 11). The second printed circuit 1120 is arranged in the second cavity 1118 and it may be held in the second cavity 1118 by means of an adhesive.

The second antenna 208 and the second electronic chip 204 are arranged on the second printed circuit 1120. The second printed circuit may also include a screen 1122 suitable for displaying a security code. In addition, identification numbers may be formed on the surface of the card body 1100, e.g. on the third layer 1016.

Returning to the device 200 of FIG. 5, the third operating frequency band AF3 of the third antenna 210 taken in isolation may be broader than the first operating frequency band AF1 of the first set-up 212 taken in isolation, as shown e.g. in FIG. 4. Likewise, the third operating frequency band AF3 of the third antenna 210 taken in isolation may be broader than the second operating frequency band AF2 of the second set-up 214 taken in isolation.

In addition, the width of the first operating frequency band AF1 of the first set-up 212 taken in isolation may be substantially identical to the second operating frequency band AF2 of the second set-up 214 taken in isolation. The width of the fourth operating frequency band AF13 of the third set-up 216 is then substantially identical to the fifth frequency band AF23 of the fourth set-up 218, thus making it possible to use the same external terminal for communicating with the first electronic chip 202 and with the second electronic chip 204.

In an example, the fourth operating frequency band AF13 of the third set-up 216 is continuous. Likewise, the firth operating frequency band AF23 of the fourth set-up 218 may be continuous.

Figure 6:
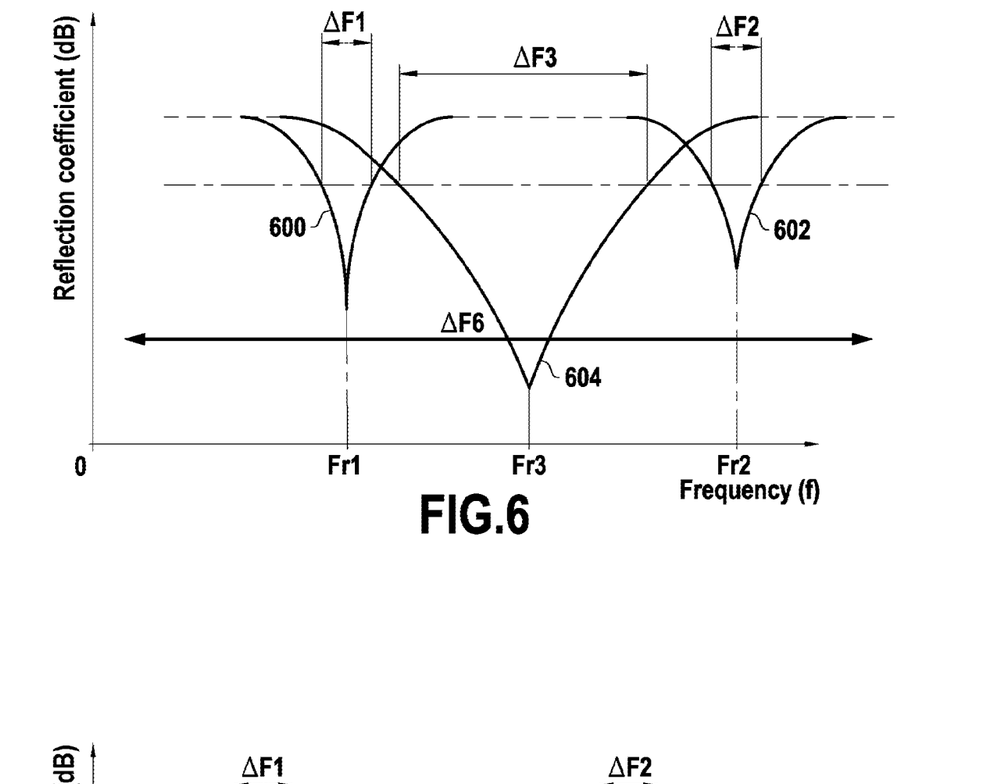
FIG. 6 is a graph showing an example of variation in reflection coefficients of an electronic wireless communication device in accordance with an embodiment of the invention.

FIG. 6 shows an example of the variation in the reflection coefficients of a device 200 in accordance with an embodiment of the invention, e.g. the device 200 of FIG. 2, of FIG. 5, or of FIG. 11.

More precisely, FIG. 6 shows an example first curve 600 showing how the reflection coefficient of the first set-up 212 taken in isolation varies as a function of frequency, an example second curve 602 showing how the reflection coefficient of the second set-up 214 taken in isolation varies as a function of frequency, and an example third curve 604 showing how the reflection coefficient of the third antenna 210 taken in isolation varies as a function of frequency.

As shown in FIG. 6, the first operating frequency band AF1 of the first set-up 212 taken in isolation corresponds to the frequencies for which the curve 600 for the reflection coefficient has smaller values. The reflection coefficient is smallest at a first resonant frequency Fr1 of the first set-up 212, said resonant frequency Fr1 lying in the first frequency band AF1.

The second operating frequency band AF2 of the second set-up 214 taken in isolation corresponds to the frequencies for which the curve 602 for the reflection coefficient has smaller values. The reflection coefficient is smallest at a second resonant frequency Fr2 of the second set-up 214, said resonant frequency Fr2 lying within the second frequency band AF2.

The third operating frequency band AF3 of the third antenna 210 taken in isolation corresponds to the frequencies for which the curve 604 for the reflection coefficient has smaller values. The reflection coefficient has its smallest value at a third resonant frequency Fr3 of the third antenna 210 taken in isolation, lying within the third frequency band AF3.

The third resonant frequency Fr3 is higher than the first resonant frequency Fr1, and is lower than the second resonant frequency Fr2.

Figure 7:
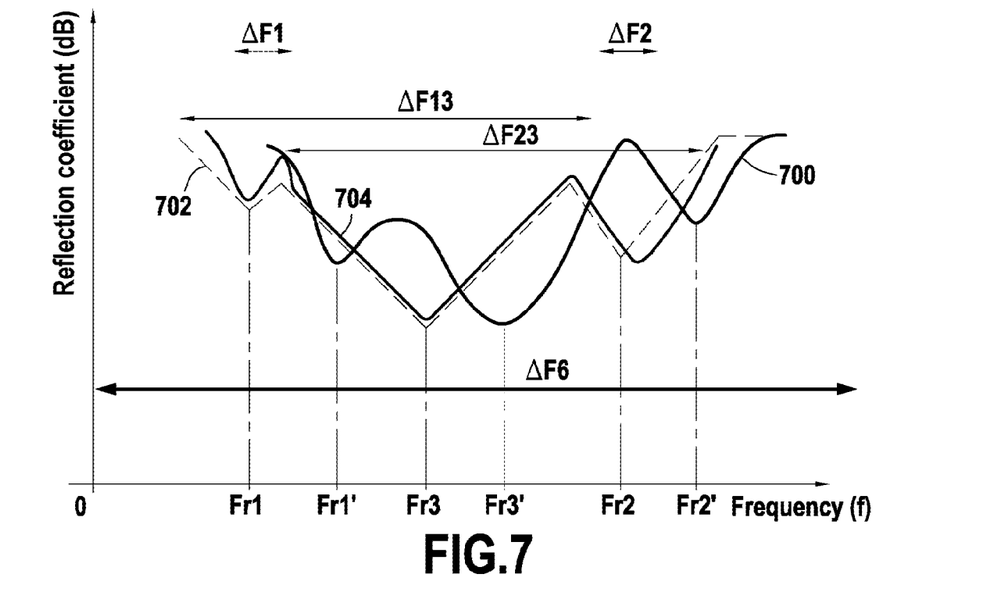
FIG. 7 is a diagram showing examples of resonance characteristics of the FIG. 6 device.

FIG. 7 shows examples of resonance characteristics of the device 200 of FIG. 6. More precisely, FIG. 7 shows a resonance characteristic 700 for the resonant set-up formed by the three antennas 206, 208, and 210 and the two electronic chips 202 and 204 for which the reflection coefficients vary as shown in FIG. 6 when both electronic chips 202 and 204 are on standby.

The term "resonance characteristic" is used to mean the values for energy transfer in the resonant frequency band of the resonant set-up. The resonant frequency band is the frequency band over which the device 200 is capable of receiving or sending electromagnetic energy. The resonant frequency band is broader than and includes the fourth frequency band AF13 over which communication can be established. Likewise, the resonant frequency band is broader than and includes the fifth frequency band AF23 for which communication can be established.

FIG. 7 also shows a resonance characteristic 702 for the set-up constituted by the three antennas 206, 208, and 210 and the two electronic chips 202 and 204 having reflection coefficients that vary as shown in FIG. 6, when the first electronic chip 202 is activated and the second electronic chip 204 is on standby, for communication with a given external terminal.

Furthermore, FIG. 7 shows a resonance characteristic 704 for the resonant set-up formed by the three antennas 206, 208, and 210 and the two electronic chips 202 and 204 having reflection coefficients that vary as shown in FIG. 6, when the second electronic chip 204 is activated and the first electronic chip 202 is on standby, for communication with a given external terminal, and when the parameters La1, Cn1, and Ra1 of the first set-up 212 are substantially identical to the parameters La2, Cn2, and Ra2 of the second set-up 214.

FIG. 7 shows that the three antennas 206, 208, and 210, and the two electronic chips 202 and 204 are configured so that activating the first electronic chip 202 or the second electronic chip 204 lowers the resonant frequencies. This is explained by the increase in the capacitance of an electronic chip 202, 204 when the electronic chip 202, 204 is activated.

Since the parameters $L_{a1}$, $C_{n1}$, and $R_{a1}$ of the first set-up 212 are substantially identical to the parameters $L_{a2}$, $C_{n2}$, and $R_{a2}$ of the second set-up 214, the curve 702 and the curve 704 are substantially superposed. When the first electronic chip 202 is activated, the first electronic chip 202 communicates over the fourth frequency band AF13. The frequency band of the characteristic 702 outside the fourth frequency band AF13 is not used for communication, but electromagnetic flux in this frequency band is received. Likewise, when the second electronic chip 204 is activated, the second electronic chip 204 communicates over the fifth frequency band AF23. The frequency band of the characteristic 704 outside the fifth frequency band AF23 is not used for communication, but the electromagnetic flux in this frequency band is received.

As shown in FIG. 7, the configuration of the resonant frequencies described with reference to FIG. 6, and their proximity, enables the fourth frequency band AF13 to be continuous, and enables the fifth frequency band AF23 to be continuous. In a variant, the resonant frequency Fr3 of the third antenna 210 taken in isolation may be lower than the resonant frequency Fr1, and it may be higher than the resonant frequency Fr2.

Figure 8:
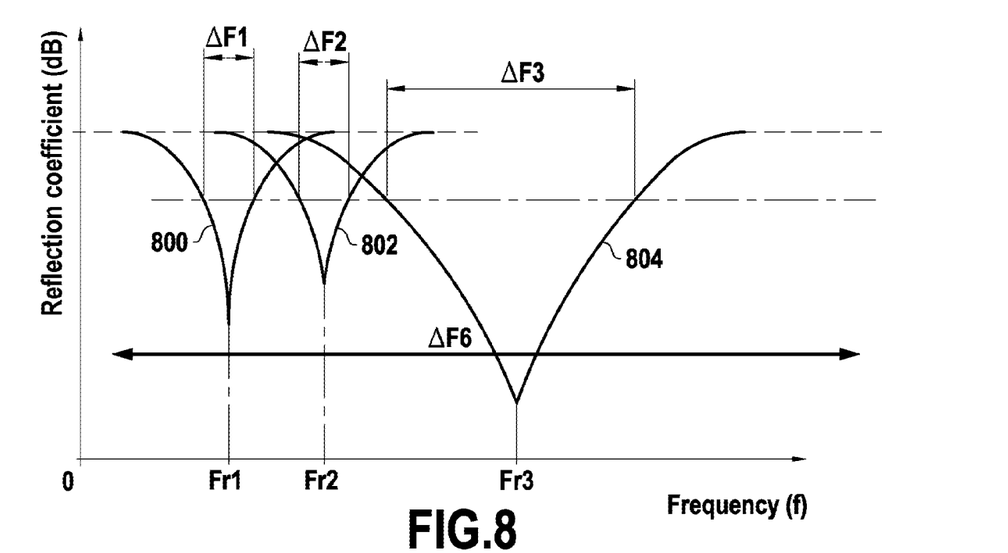
FIG. 8 is a graph showing an example of variation in reflection coefficients of an electronic wireless communication device in accordance with an embodiment of the invention.

FIG. 8 shows another example of variation in the reflection coefficients of a device 200 in accordance with an embodiment of the invention, e.g. the device 200 of FIG. 2, of FIG. 5, or of FIG. 11.

More precisely, FIG. 8 shows an example first curve 800 showing how the reflection coefficient of the first set-up 212 taken in isolation varies as a function of frequency, an example second curve 802 showing how the reflection coefficient of the second set-up 214 taken in isolation varies as a function of frequency, and an example third curve 804 showing how the reflection coefficient of the third antenna 210 taken in isolation varies as a function of frequency.

In this example, the resonant frequency Fr3 of the third antenna 210 taken in isolation is higher than the resonant frequency Fr1, and is higher than the resonant frequency Fr2.

Figure 9:
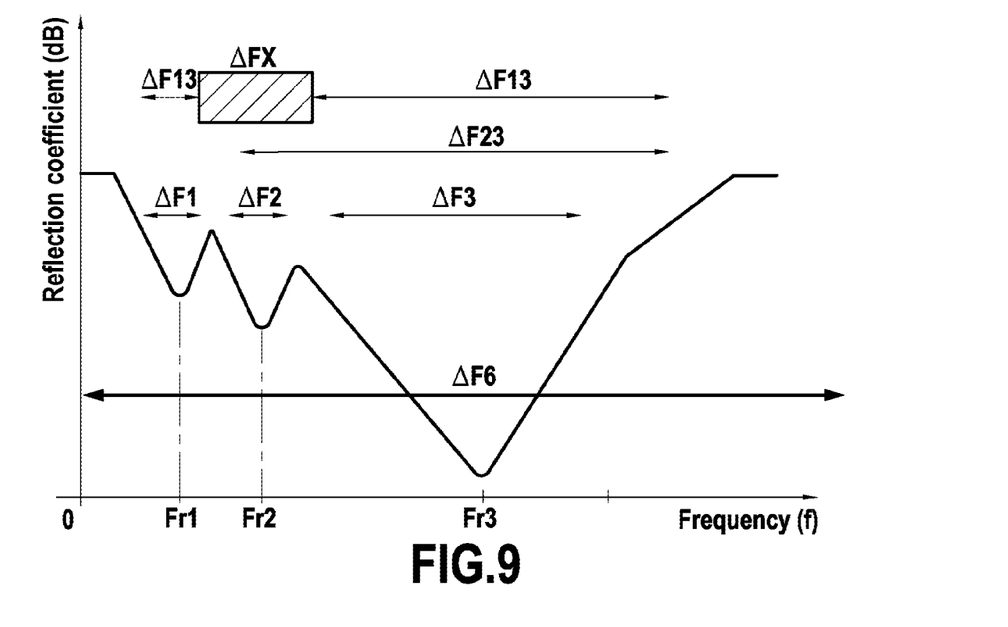
FIG. 9 is a diagram showing an example of a resonance characteristic of the FIG. 8 device.

FIG. 9 shows an example resonance characteristic of the FIG. 8 device, or more precisely a resonance characteristic of the set-up formed by the three antennas 206, 208, and 210, and the two electronic chips 202 and 204 for which the reflection coefficients vary as shown in FIG. 8, when the first electronic chip 202 is activated and the second electronic chip 204 is on standby, for communication with a given external terminal. As shown in FIG. 9, the configuration of resonant frequencies described with reference to FIG. 8 does not enable the fourth frequency band AF13 to be continuous.

Specifically, there exists a frequency band AFX in which communication with the first electronic chip 202 is not possible, since the reflection coefficient of the first antenna 206 and the reflection coefficient of the second antenna 208 have values that are too high in this frequency band AFX. Thus, in the frequency band AFX, there is no resonance contribution from the first antenna 206, with all of the resonance coming only from the contribution from the second antenna 208. No spectral component of the frequency band AFX comes from the resonance of the first antenna 206. Thus, an external terminal, communicating using the first protocol in the frequency band AFX cannot communicate with the first electronic chip 202.

The device described with reference to FIGS. 6 and 7 is thus more advantageous than the device described with reference to FIGS. 8 and 9, since it guarantees continuity of the fourth frequency band AF13 and of the fifth frequency band AF23, and thus guarantees greater bandwidth.

Moving the resonant frequency Fr1 closer to the resonant frequency Fr3 enables the fourth frequency band AF13 to be continuous. Nevertheless, the width of the fourth frequency band AF13 cannot be equivalent to the width of the fifth frequency band AF23.

Figure 10:
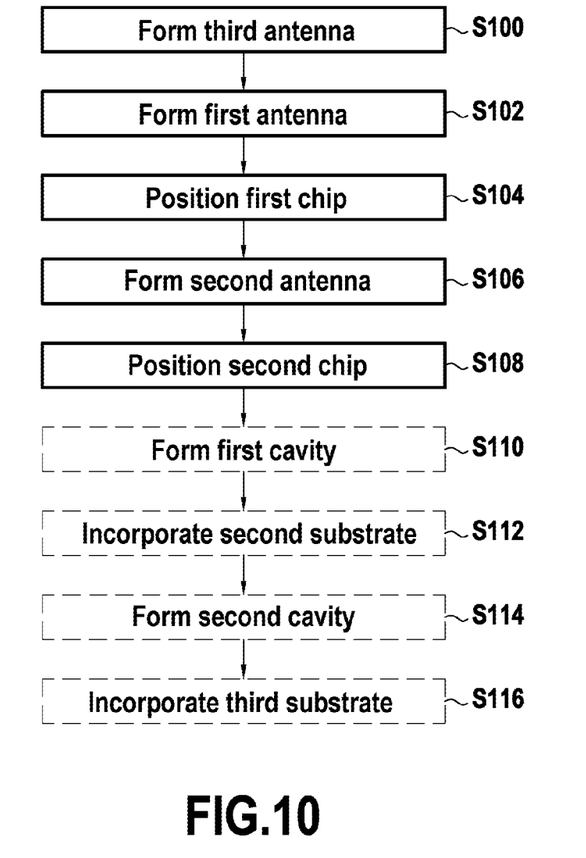
FIG. 10 is a flow chart showing the main steps of a method of fabricating an electronic wireless communication device in accordance with an embodiment of the invention.

FIG. 10 shows a method of fabricating an electronic device in accordance with an embodiment of the invention, e.g. the device of FIG. 2, the device of FIG. 5, or the device of FIG. 11.

In a step S100, the third antenna 210 is formed on a layer of a first substrate having at least one layer. In the example where the device is a smart card, the first substrate is the card body and the layer on which the third antenna 210 is formed is the first layer of the card body. In the example of FIG. 11, the first substrate is the card body 1100 and the layer on which the third antenna 210 is formed is the first layer 1102.

In a step S102, the first antenna 206 is formed on a second substrate or on the first substrate. In an example where the device is a smart card, the second substrate is the first printed circuit. In the example of FIG. 11, the second substrate is the first printed circuit 1112.

In a step S104, the first chip 202 is positioned on the first substrate or on the second substrate, so as to be electrically connected to the first antenna 206.

In a step S106, the second antenna 208 is formed on a third substrate or on the first substrate. In an example where the device is a smart card, the third substrate is the second printed circuit. In the example of FIG. 11, the third substrate is the second printed circuit 1120.

In a step S108, the second chip 204 is positioned on the first substrate or on the third substrate, so as to be electrically connected to the second antenna 208.

When the first antenna 206 is formed on a second substrate, the method further includes a step S110 of forming a first cavity in the first substrate, and a step S112 of incorporating the second substrate in the first cavity. In the example of FIG. 11, the first cavity is the first cavity 1116.

Furthermore, when the second antenna 208 is formed on a third substrate, the method further includes a step S114 of forming a second cavity in the first substrate, and a step S116 of incorporating the third substrate in the second cavity. In the example of FIG. 11, the second cavity is the second cavity 1118.

The antennas 206, 208, and 210 are formed in such a manner that the third antenna 210 is adapted to be coupled electromagnetically with the first antenna 206 and the second antenna 208 so that the first electronic chip 202 is configured to communicate with a first external terminal using a first protocol by means of a first antenna pair formed by the first antenna 206 and the third antenna 210, and the second electronic chip 204 is configured to communicate with the first external terminal and/or a second external terminal using a second protocol by means of a second antenna pair formed by the second antenna 208 and the third antenna 210.

The invention claimed is:

1. An electronic wireless communication device comprising:
 a first electronic chip and a second electronic chip;
 a first antenna electrically connected to the first electronic chip; and
 a second antenna electrically connected to the second electronic chip;
 wherein the electronic device further comprises a third antenna adapted to be electromagnetically coupled with the first antenna and with the second antenna, such that:
 the first electronic chip is configured to communicate with a first external terminal using a first protocol by means of a first antenna pair formed by the first antenna and the third antenna; and
 the second electronic chip is configured to communicate with the first external terminal or a second external terminal using a second protocol by means of a second antenna pair formed by the second antenna and the third antenna,
 wherein the first antenna, the second antenna, and the third antenna are substantially planar, and each presents an elongate shape defining a length and a width, the first antenna, the second antenna, and the third antenna being arranged in such a manner that:
 the projection of the longitudinal direction of the first antenna onto the plane of the third antenna is parallel to the lateral direction of the third antenna; and
 the projection of the longitudinal direction of the second antenna onto the plane of the third antenna is parallel to the longitudinal direction of the third antenna.

2. The electronic device according to claim 1, wherein the area defined by the third antenna is greater than the area defined by the first antenna or the area defined by the second antenna.

3. The electronic device according to claim 1, wherein the area defined by the first antenna is substantially identical to the area defined by the second antenna.

4. The electronic device according to claim 1, wherein the first antenna is arranged at a first distance from the second antenna and at a second distance from the third antenna, the first distance being greater than the second distance.

5. The electronic device according to claim 1, wherein the third antenna is substantially planar, and the first antenna, the second antenna, and the third antenna are arranged in such a manner that the projection of the first antenna onto the plane of the third antenna extends outside the third antenna, and the projection of the second antenna onto the plane of the third antenna extends inside the third antenna.

6. The electronic device according to claim 1, wherein an operating frequency band of the third antenna taken in isolation is broader than an operating frequency band of a first set-up comprising the first electronic chip and the first antenna taken in isolation, or than an operating frequency band of a second set-up comprising the second electronic chip and the second antenna taken in isolation.

7. The electronic device according to claim 6, wherein the width of the operating frequency band of the first set-up comprising the first electronic chip and the first antenna taken in isolation is substantially identical to the operating frequency band of the second set-up comprising the second electronic chip and the second antenna taken in isolation.

8. The electronic device according to claim 7, wherein:
 a third set-up comprising the first electronic chip and the first antenna pair operates in a first frequency band that is continuous; and
 a fourth set-up comprising the second electronic chip and the second antenna pair operates in a second frequency band that is continuous.

9. The electronic device according to claim 1, wherein the first protocol of the first electronic chip is defined by the standard ISO 14433 and the second protocol of the second electronic chip is defined by the standard ISO 15693.

10. The electronic device according to claim 1, wherein:
the first electronic chip is configured to communicate with the first external terminal by means of the first antenna pair at a frequency of about 13.56 MHz; or
the second electronic chip is configured to communicate with the first external terminal or the second external terminal by means of the second antenna pair at a frequency of about 13.56 MHz.

11. The electronic device according to claim 1, wherein the first electronic chip is configured to make a payment and the second electronic chip is configured to control an electronic component of said electronic device.

12. The electronic device according to claim 11, wherein the electronic component is a screen adapted to display a security code.

13. The electronic device according to claim 12, further comprising identification numbers, wherein the security code is used in combination with the identification numbers in order to make a payment.

14. The electronic device according to claim 1, said electronic device being a smart card of ID-1 format as defined by the standard ISO 7810.

15. A method of fabricating an electronic device according to claim 1, said method comprising:
forming the third antenna on a layer of a first substrate comprising at least one layer;
forming the first antenna on a second substrate or on the first substrate;
positioning the first chip on the first substrate or on the second substrate;
forming the second antenna on a third substrate or on the first substrate; and
positioning the second chip on the first substrate or on the third substrate.

* * * * *